United States Patent [19]
Gibbons

[11] Patent Number: 5,245,331
[45] Date of Patent: Sep. 14, 1993

[54] MULTIPLE ADAPTER RESPONSE DETECTION CIRCUIT

[75] Inventor: John C. Gibbons, Macedonia, Ohio

[73] Assignee: Allen-Bradley Company, Inc., Milwaukee, Wis.

[21] Appl. No.: 660,324

[22] Filed: Feb. 22, 1991

[51] Int. Cl.$^5$ ............................................. H04B 1/00
[52] U.S. Cl. ........................ 340/825.52; 340/825.36; 340/825.37
[58] Field of Search ...................... 340/825.07, 825.08, 340/825.16, 825.36, 825.37, 825.52; 370/85.2, 85.3, 92

[56] References Cited

U.S. PATENT DOCUMENTS

| | | | |
|---|---|---|---|
| 4,667,323 | 5/1987 | Engdahl et al. | 370/85 |
| 4,825,204 | 4/1989 | Nakamura | 340/825.52 |
| 4,920,339 | 4/1990 | Friend et al. | 340/825.52 |
| 5,012,468 | 4/1991 | Siegel et al. | 370/85.5 |

Primary Examiner—Donald J. Yusko
Assistant Examiner—Dervis Magistre

[57] ABSTRACT

An adapter response circuit indicates the number of adapters on a link responding to a given address and hence permits the detection of possible data collisions. Each adapter responding to the address transmitted on the link induces a current on a common conductor. The magnitude of the current unambiguously identifies the number of adapters responding to that address. The proper resistive termination of the link may be checked by inducing a similar incremental current on the conductor and evaluating a voltage variation indicating the presence or absence of a termination resistor.

7 Claims, 4 Drawing Sheets

READ

WRITE

MULTIPLE ADAPTER RESPONSE DETECTION CIRCUIT

BACKGROUND OF THE INVENTION

1. Field of the Invention

The field of the invention is industrial control systems including programmable controllers, and more particularly, communication links for connecting such controllers with remote input and output circuits.

2. Background Art

Industrial control systems such as those described in U.S Pat. Nos. 3,810,118, 3,942,158, 4,165,534 and 4,442,504 are typically connected to industrial equipment such as assembly lines or machine tools to operate such equipment in accordance with a stored program. The stored program includes instructions which, when executed, examine the condition of selected inputs to the system from sensing devices on the controlled equipment and energize or de-energize selected outputs from the system to operate devices on the controlled equipment.

Inputs to the system may be discrete binary signals such as those from switches which may detect limits of process variables such as motion, temperature, time, or other quantities, or the inputs may be analog measures of the process variables themselves, which are generally then converted to digital binary form for processing. Likewise, the outputs of the system may be either binary outputs as implemented by mechanical or solid-state relays, or analog outputs produced by means of a digital to analog converter.

The inputs and outputs processed by the system are received by the system through I/O modules. A number of I/O modules may be placed with a programmable controller in a rack containing a backplane which electrically interconnects the I/O modules with the controller. Alternatively, the I/O modules may be remotely located and connected to the controller by means of a communications "link". An I/O scanner incorporated into the controller allows the controller to send and receive data on this link.

Remote I/O modules may be grouped together within a remote rack having a backplane interconnecting the remote I/O modules. This remote rack is then connected to the serial link by means of an adapter. The adapter provides an interface between the data on the link and the backplane of the rack and provides a means for each I/O module to receive and transmit data on the link. Sixteen remote I/O racks may be connected in "parallel" on the link, that is, connected so that each rack may monitor the link simultaneously.

The link connecting the controller and the adapters of the remote I/O racks may take one of a number of topologies. One topology is that of a multidrop or "daisy chain" configuration. In such a configuration, each adapter is positioned along the link so that it is connected directly with the controller and every other adapter. The adapters are each given a unique address and messages are directed to a particular adapter by transmitting the appropriate address before the message.

A remote rack may hold 16, 12, 8, or 4 I/O modules and therefore the address transmitted on the link before a message includes a rack address and a starting quarter to permit multiple racks with less than 16 I/O modules to share one rack address.

Orderly communication between the controller and the remote adapters is ensured by having all communications on the link initiated by the controller. If the controller needs to transmit or "write" data to the remote I/O racks, it transmits the data on the link and awaits the return of a confirmation signal. If the controller needs to receive or "read" data from the remote I/O rack, it transmits a data request on the link and awaits the return of the data from the remote I/O rack.

The address of each remote adapter is selected by the user and entered by switches on each adapter. This user-selected addressing permits maximum flexibility in configuring the industrial controller and its remote I/O. Remote I/O racks may be added or dropped as necessary and their corresponding addresses reassigned to minimize changes in the controller program.

This increased flexibility in configuring the industrial control system as provided by user-selectable addressing, carries with it the risk of two remote I/O racks being inadvertently assigned to the same address.

If duplicate addresses are assigned to two or more adapters, data communicated on the link may be corrupted by the interference of those adapters transmitting to the link simultaneously. Such interference may also result from multiple adapters responding to the same address as a result of adapter circuitry failure. Such multiple simultaneous transmissions are termed "collisions".

Industrial control systems are sensitive to even a low probability of collision even if the collisions may be reliably detected. The link between the controller and the remote I/O operates under severe real time constraints, and periodic retransmission of garbled data caused by a collision will unacceptably degrade the link's maximum response time. Also, the possibility an undetected collision and thus of undetected garbled data is a serious problem in the industrial environment where expensive and complex machinery is being controlled.

In some instances, a collision may cause electrical damage to high powered output circuits on the adapters when each attempts to take control of the link.

SUMMARY OF THE INVENTION

The present invention provides a method of unambiguously determining whether multiple adapters on a link are responding to the same address. Specifically, an address transmitted on the link is read by each of the adapters which compare that address to its pre-assigned adapter address. The link includes a conductor and if the address on the link matches the adapter address for a particular adapter, that adapter generates an incremental current in the conductor. These incremental currents are combined to produce a total current related to the number of adapters so responding. This total current is compared to a predetermined threshold to ensure that only a single adapter is responding.

It is a general object of the invention, therefore, to detect the presence of multiple adapters responding to a single address and therefore to avoid message collisions that might result in garbled data or damaged circuitry.

The current may be induced on the conductor by means of a resistor having one end connected to a voltage source and the other end connected to the conductor by a switch.

It is another object of the invention, therefore, to provide a simple method of producing incremental currents on the conductor which indicate the number of adapters responding to an address, without the need for complex circuitry.

The incremental currents on the conductor may be summed across a resistor connected between the conductor and a reference voltage, and the currents measured with a voltage comparator responsive to the voltage across that resistor.

Accordingly, it is yet another object of the invention to provide a simple method of measuring the combined incremental currents on the conductor and thus to indicate the number of adapters responding to an address.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
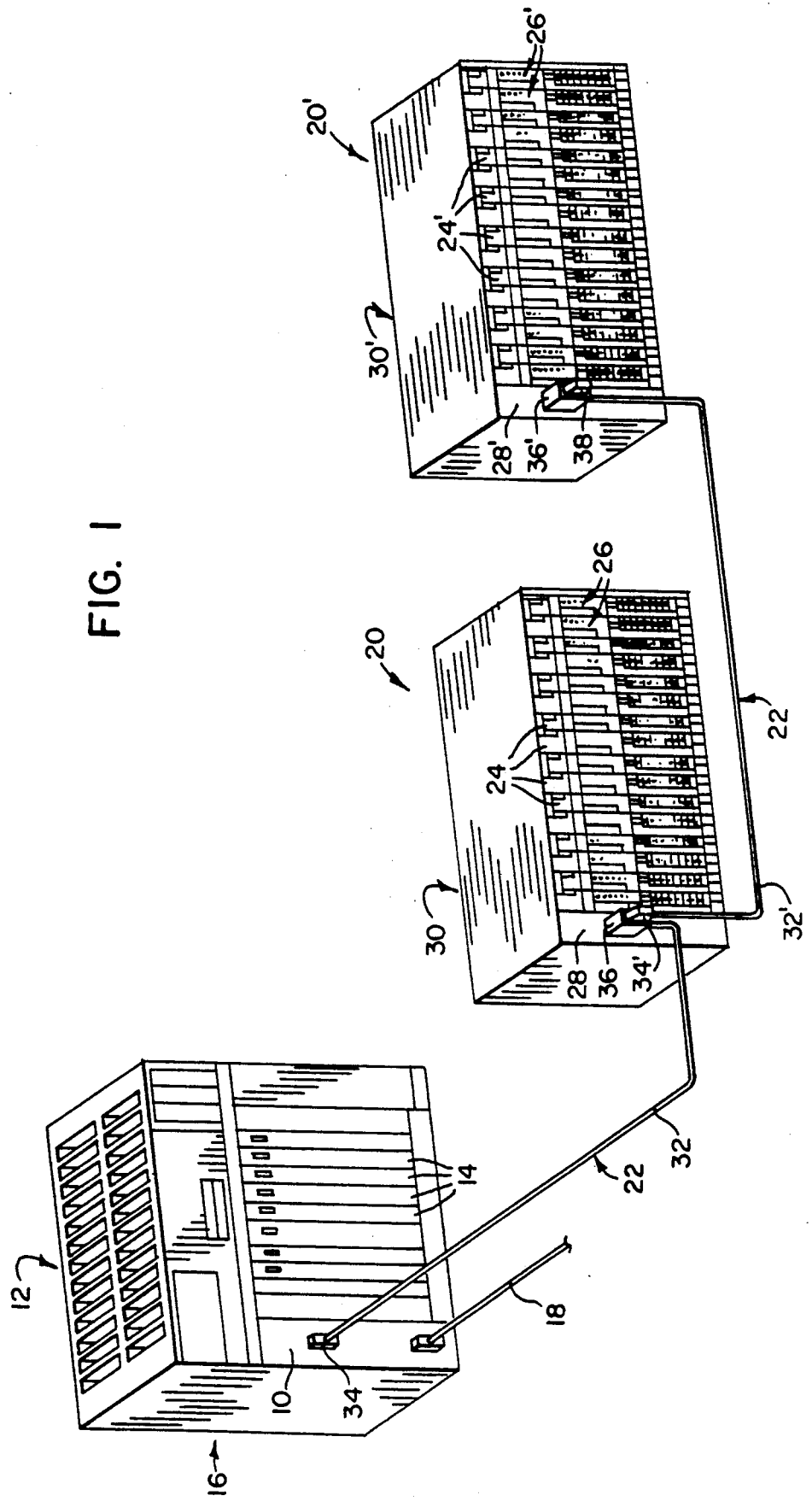
FIG. 1 is a pictorial view of the communications link of the present invention showing a controller and several remote I/O adapters and racks arranged in daisy chain configuration.

Referring to FIG. 1, an industrial control system employing the multiple adapter response (MAR) detection circuitry of the present invention includes a programmable controller 10 communicating through a backplane 12 with adjacent I/O modules 14 within a rack 16. Additional remote I/O modules may be contained within one or more remote I/O racks (not shown) connected to the programmable controller 10 via a serial remote I/O link 18. The programmable controller 10 sequentially addresses each remote I/O rack and the modules contained therein.

The remote I/O racks may be located up to 5000 feet from the programmable controller 10. A programmable controller with remotely located I/O racks is disclosed generally in Markley et al. U.S. Pat No. 3,997,879, issued Dec. 14, 1976 and entitled: "Fault Processor for Programmable Controller with Remote I/O Interface Racks."

The data throughput of the remote I/O link 18 is limited by its serial format. This limit of data throughput may be important for certain high speed I/O functions or when a large number of remote I/O racks requires the scanning of many I/O addresses.

The programmable controller 10 also communicates with a number of local I/O racks 20 via a parallel local I/O link 22. The local I/O racks 20 are similar to the remote I/O racks, having up to 128 I/O circuits arranged in I/O modules 24 held in as many as sixteen slots 26. The local I/O racks 20 connect to the parallel local I/O link 22 through an adapter 28 held in a separate slot 26 and communicating with the I/O modules 24 over a backplane 30 on the rear of the rack 20.

The local I/O link employs a 50 conductor cable 32 having conductors arranged in 25 twisted pairs and connected to the programmable controller 10 by a standard male 50-pin D-type connector 34. The other end of the cable 32 is attached to the adapter 28 of a first local I/O rack 20 by one connector, a two headed connector 36. The two headed connector is constructed of two standard male 50-pin D-type connectors wired in parallel. The connectors are held physically in a single shell so that they face in opposite directions with their mating axes parallel to each other to present an inner and outer facing connector. The uncommitted outer connector of the two headed connector 36 may be attached to a second cable 32' similar to the first. One end of this second cable 32', fitted with a single male 50-pin D-type connector 34', is attached to the outer connector of the two-headed connector 36, and the second end of the second cable 32', fitted with a two-headed connector 36' is attached to an adapter 28' of a second local I/O rack 20'. This connection system, termed "daisy chaining", may be repeated for multiple local I/O racks 20, each of which then has direct and simultaneous access to the local I/O link 22.

The connectors on the ends of the cables 32 and 32' having single connectors 34 and 34', are mechanically attached to their mating connectors on programmable controller 10 or on two-headed connector 36 or 36' by means of engaging, spring-loaded hooks as are known in the art. In contrast, the two-headed connectors 36, 36' are attached to their mating connectors on the adapters 28 and 28' by means of captive machine screws (not shown) that are threaded into threaded bored holes in the mating connectors. The captive machine screws are positioned so that they may be removed from the threaded holes thus disengaging the two-headed connecters 36 and 36' from the adapters 28 and 28', without disturbing either the connections between the outer connector of the two-headed connector 36 and the connector 24', or between the two-headed connecter 36' and the terminating unit 38. Thus, any local I/O rack may be removed from the link 22 without disturbing the integrity of the communications on the link 22 between the other adapters 28 (28') on local I/O racks 20 (20') and the programmable controller 10.

The outer uncommitted connector of the last two-headed connector 36' receives a terminating unit 38 mating with the outer uncommitted connector of the two-headed connector 36' to shunt certain of the twisted pairs of the cable 32' with terminating resistances (not shown in FIG. 1) to prevent the reflection of signal energy at the end of the cable 32' as is understood in the art. The mechanical attachment of the cables 32 and 32', as described, preserves the linear nature of the daisy chaining and prevents "star" type configurations with cables radiating out from a single common connection point. Specifically, there are no bored holes in the controller 10 for receiving the two-headed connector's machine screws. This ensures that the link 22 may be reliably terminated with a single termination unit 38.

As mentioned the local I/O link 22 employs a 50 conductor cable 32, 32' to permit parallel transmission of data and the higher data transmission rate commensurate with this format. Table I summarizes the function of each conductor in the cables 32 and 32'.

TABLE I

| conductor number | designation |
|---|---|
| 1-32 | data/address |
| 33,34 | parity |
| 35,36 | mode line |
| 37,38 | address strobe |
| 39,40 | read strobe |
| 41,42 | write strobe |
| 43,44 | data transfer acknwldg. |
| 45,46 | bus error |
| 47 | MAR power |
| 48 | MAR |
| 49 | MAR return |
| 50 | MAR ground |

Data and addresses communicated between the programmable controller 10 and the local I/O adapters 28 and 28' are multiplexed onto the first 16 twisted pairs of the cable 32, 32' (conductors 1-32). These twisted pairs are driven differentially, as is understood in the art, to improve noise immunity. The 17th twisted pair (conductor 33 and 34) provides a parity bit for these first sixteen pairs.

Conductors 35 through 46 are combined in differentially driven twisted pairs to provide six control lines: mode, address strobe ("AS"), read strobe ("RS"), write strobe ("WS"), cable data transfer acknowledge ("CDTACK") and cable bus error ("CBERR"), as will be discussed further below.

The remaining four conductors are used in the multiple adapter response ("MAR") detection circuitry of the invention and include: MAR power ("PWR"), MAR ground ("GND"), the MAR line ("MAR"), and the MAR return ("RTN"); (collectively the "MAR Lines"), as will also be described further below.

GENERAL DESCRIPTION OF THE MAR CIRCUITRY

Figure 2:
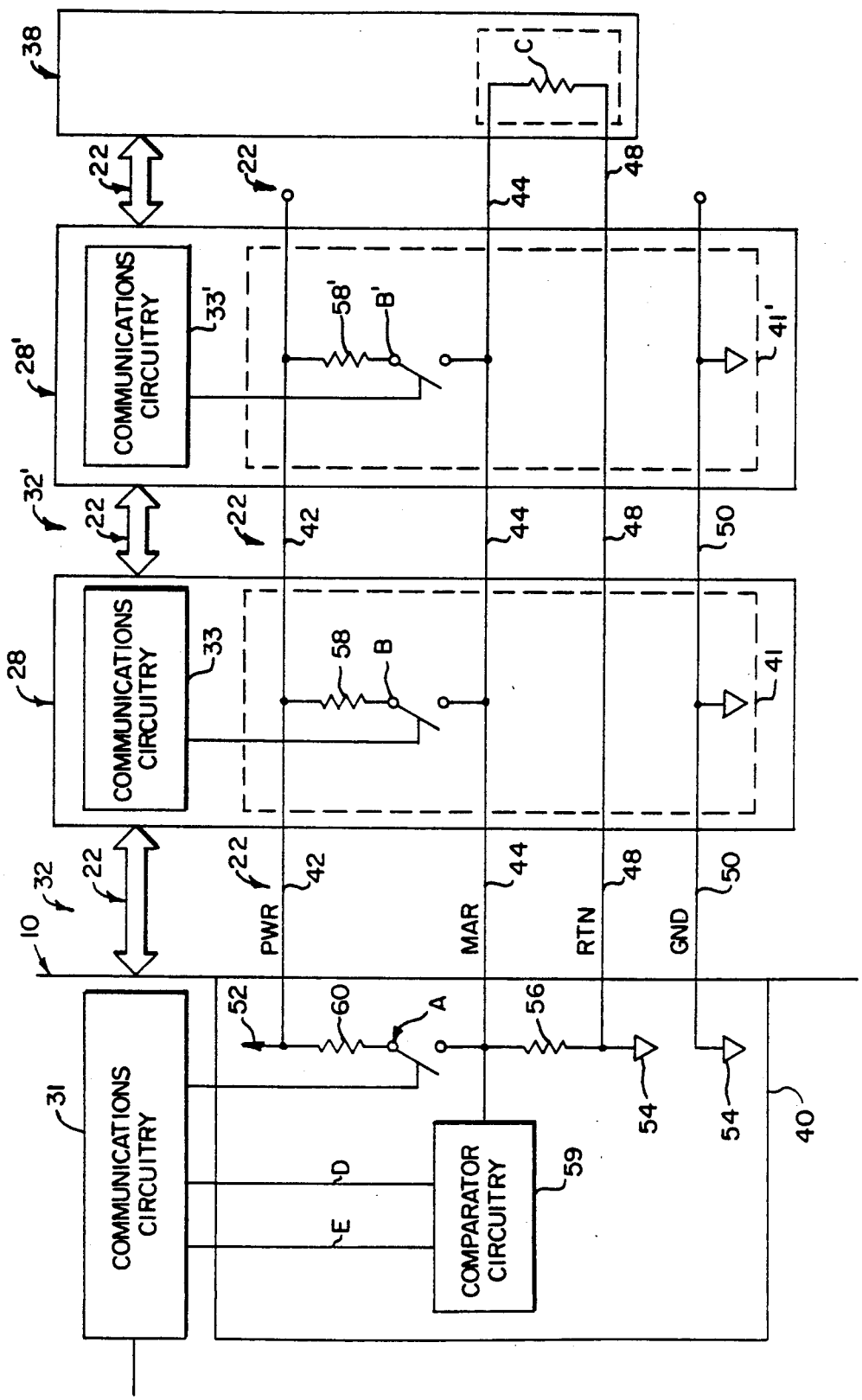
FIG. 2 is simplified schematic representation of the multiple adapter response detection circuitry of the controller and of the two remote I/O adapters shown in FIG. 1 and also showing the MAR conductor of the link and its termination resistor.

Referring to FIG. 2, the MAR lines connect a MAR detection circuit on the programmable controller 10 ("controller MAR circuit 40") and to MAR detection circuits on one or more local I/O adapters 28, 28' ("adapter MAR circuits 41, 41'"). As described above, the cable 32, 32' is daisy chained between the programmable controller 10 and the local I/O adapters 28, 28' so that each adapter MAR circuits 41, is attached in parallel with other adapter MAR circuits 41' along the link 22.

The PWR line 42 is connected, at the controller MAR circuit 40, to a positive voltage source 52 and communicates that voltage 52 to the adapter MAR circuits 41 and 41'. Likewise the GND line 50 connects the adapter MAR circuits 41 and 41' to a ground reference 54 at the controller MAR circuit 40.

Within the controller MAR circuit 40, the MAR line 44 and the RTN line 48 are connected through a resistor 56, and the MAR line 44 is connected to the input of comparator circuitry 59 which evaluates the voltage across the resistor 56. Also within the controller MAR circuit 40, the RTN and GND lines 48 and 50 are connected together so that the RTN line 48 is at ground potential.

The MAR and return lines 44 and 48, like all the conductors of the cable 32, 32' connect to each of the local I/O adapters 28, 28'. After the last adapter 28, the MAR and RTN lines 44 and 48 are shunted by a termination resistor C.

Each of the adapter MAR circuits 41 and 41' includes a resistor 58, (58') with one end attached to the PWR line 42 and one end connected through series, normally-open switch B (B') to the MAR line 44.

Within the MAR detection circuit 40, a resistor 60 with one end attached the PWR line 42 is connected through a series, normally open switch A to the MAR line 44.

OPERATION OF THE MAR CIRCUIT

I. Detection of Multiple Adapter Responses

Figure 3:
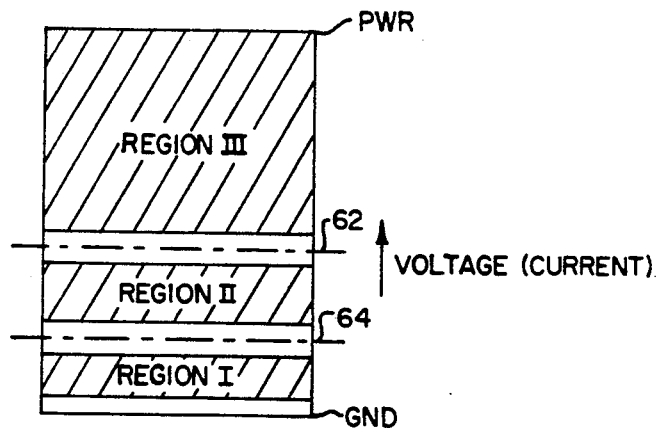
FIG. 3 is a graph of the voltage range on the MAR conductor of FIG. 2 showing the regions corresponding to different numbers of responding adapters or the presence or absence of a termination resistor.

Referring to FIGS. 2 and 3, the voltage on the MAR line 44 is limited to the range between the voltages of the PWR and GND lines 42 and 50.

During a period of no link activity, each of switches B and B' are open. Accordingly, the voltage across resistor 56 is in Region I (shown in FIG. 3) near ground as a result of the parallel connection of resistor 56 and terminating resistor C across the MAR line 44 and the RTN line 48, the latter which is at ground potential.

When a particular adapter 28 or 28' is addressed by the programmable controller 10 via the link 22, the switch B associated with that adapter 28 is closed as will be described further below. If only one such adapter 28 responds to the given address, as is proper, the voltage on the MAR line 44 will increase and rise into Region II of FIG. 3 as determined generally by the resistive divider formed by resistor 58 in series with the parallel combination of resistors 56 and C, this resistive divider operating, between PWR and GND lines.

In the event that two adapters 28 and 28' respond to the address issued by the programmable controller 10 over the link 22, either though the same address being assigned by the user to both adapters 28 and 28' or a decoding circuit failure, then two or more resistors 58 and 58' will be connected in parallel between the PWR line 42 and the MAR line 44 forming a new resistive divider with the parallel combination of resistor 56 and C, to ground, and the voltage on the MAR line 44 across resistor 56 will rise into Region III as shown in FIG. 3.

The comparator circuit 59 employs a high threshold 62 and low threshold 64 to distinguish between these three Regions I, II, and III and to generate two digital signals D and E having a high and low state which indicate to the programmable controller 10 into which Region the voltage of the MAR line 44 falls and thus whether none, one, or more than one adapter MAR circuit is responding.

If the low threshold 64 is exceeded, line D goes high indicating the number of adapter is greater than or equal to one. If the high threshold 62 is exceeded, line E goes high indicating that the number of adaptors is greater than 1. Thus, the combination of these signals positively identifies whether the proper number of adapters, i.e. one, is responding.

II. Detection of Improper Termination

The proper termination of cable 32 improves the integrity of the link 22 and is also necessary for the above described detection of multiple adapter responses. If the termination resistor C is missing or of improper value, the voltages on the MAR line 44 will differ from their proper values for the various numbers of adapter responses as shown in FIG. 3. For this reason, the presence of a termination resistor C is first determined by the controller MAR circuit 40.

Prior to activity on link 22, typically when the programmable controller 10 is first activated, switch A in the controller MAR circuit 40 is closed. The value of the resistance 60 connected to this switch A is the same as the value of resistors 58 and 58' and hence closing switch A raises the voltage on the MAR line 54 to Region II, as if one adapter were responding only if the termination resistor C is in place. If the termination resistor C is missing or too high in value, the voltage on the MAR line 44 will rise into the Region III indicating improper termination. Conversely, if the termination resistor C is present but too low in value, the voltage on the MAR line 44 will not rise to Region II but will remain in Region I also indicating improper termination.

These conditions are summarized in the following table in which a "1" indicates a closed switch, a proper termination, or a digital "true" state, and in which a "0" indicates an open switch, a missing termination, or a digital "false" state depending on the column as will be apparent from context:

TABLE II

| A | B | B' | C | MAR line | D | E | status |
|---|---|---|---|---|---|---|---|
| 1 | 0 | 0 | 1 | Region II | 1 | 0 | test-termination OK |
| 1 | 0 | 0 | 0 | Region III | 1 | 1 | test-termination high |
| 0 | 0 | 0 | 1 | Region I | 0 | 0 | no response |
| 0 | 1 | 0 | 1 | Region II | 1 | 0 | one response |
| 0 | 1 | 1 | 1 | Region III | 1 | 1 | two or more responses |

DETAILED DESCRIPTION OF THE MAR CIRCUITRY

Figure 4:
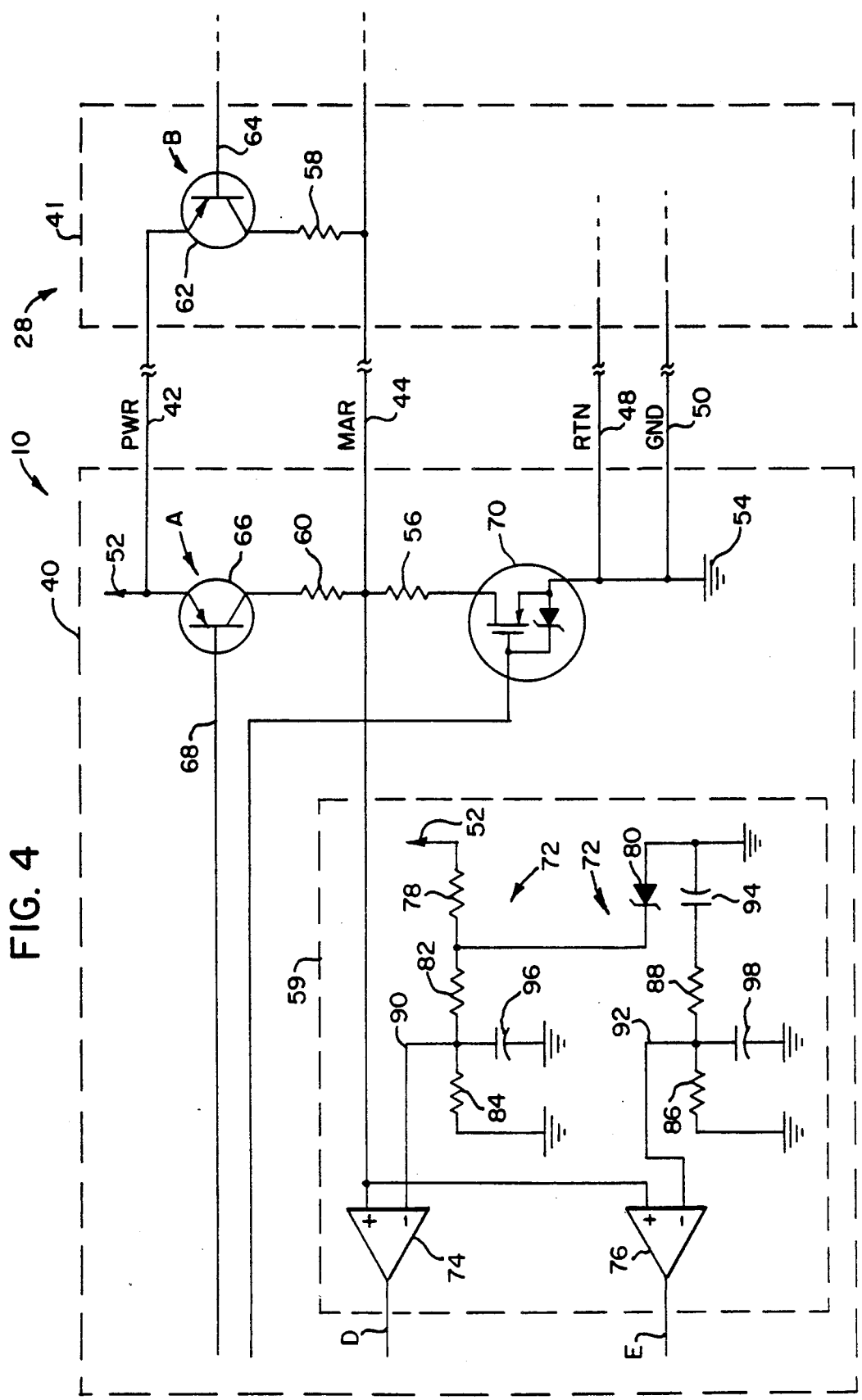
FIG. 4 is a detailed schematic of the multiple adapter response circuitry of FIG. 2.

Referring to FIGS. 1 and 4, switch B in each of the adapter MAR circuits 41, 41' is realized by means of a PNP transistor 62 with its emitter connected to the PWR line 42 and its collector connected to the resistor 58 which in turn connects to the MAR line 44. A signal 64 at the base of transistor 62 with a voltage approximately equal to that of the PWR line 42 holds the transistor 62 off or the switch B open. The switch B is closed when the voltage of the base signal 64 drops below the voltage of the PWR line 42. The base signal 64 to the transistor 62 is generated by communication circuitry 33 in the adapter 28 as will be described below.

Switch A in the controller MAR circuit 40 is constructed identically to that of switch B in the adapter MAR circuit 41 including a PNP transistor 66 with its emitter connected to the PWR line 42 and its collector connected to the resistor 60 which in turn connects to the MAR line 44. A base signal 68 to the transistor 66 is generated by communication circuitry 31 associated with the programmable controller 10 in response to link 22 activity as will be described below.

Resistor 56 is connected to ground through a N-channel MOSFET 70 which permits it to be deactivated when the programmable controller 10 deactivated in a stand-by mode as is useful in certain redundant configurations. During the MAR detection process, the FET 70 is always in the conducting state.

Resistor networks 72 in conjunction with comparators 74 and 76 establish the threshold voltages 62 and 64 of FIG. 3. First, the power supply voltage 52 is precisely regulated by series resistor 78 joining the cathode of zener diode 80, whose anode is connected to ground. The regulated voltage at the junction of resistor 78 and zener diode 80 is divided by two resistive dividers formed of series resistors 82 and 84 to ground and series resistors 86 and 88 to ground which produce regulated threshold voltages 90 and 92 equal respectively to the low and high threshold voltages 64 and 62 respectively. Capacitor 94 to ground from the junction of resistor 78 and zener diode 80 to ground and capacitors 96 and 98 shunting voltages signals 90 and 92 to ground respectively, serve to decouple these voltages from power supply variation as is known in the art.

Voltage signal 90 is connected to the inverting input of comparator 74 which receives the MAR line 44 at its non-inverting input. The output D of the comparator 74 is high, therefore, only when the MAR line 44 exceeds the voltage 90 or the threshold voltage 64. This output D generally indicates that one or more adapters 28, 28' are responding to the programmable controller 10.

Voltage signal 92 is connected to the inverting input of comparator 76 which also receives the MAR line 44 at its non-inverting input. The output E of the comparator is high, therefore, only when the MAR line 44 exceeds the voltage 92 or the threshold voltage 62. This output E generally indicates that more than one adapter 28, 28' is responding to the programmable controller 10. The two outputs D and E together, therefore, serve to establish whether none, one, or more than one adapter 28, 28' is responding to the programmable controller 10 as has been described above. These outputs D and E are received by the programmable controller 10 as will be described.

Referring for the moment to FIG. 1 and Table 1, the adapters 28, 28' of the local I/O racks 20, 20' include well understood communications circuitry 33 that handle the routine protocol of the link 22 including monitoring the address, data and control lines of the link 22 and triggering the appropriate responses by the adapter 28, 28'. The communications circuitry may comprise generally a dedicated microprocessor in combination with link driving circuitry, such as in known in the art, or may be a custom integrated circuit embodying a state-machine for response to link protocols and communicating with the I/O modules 24 and 24' directly.

Likewise, the link protocol at the programmable controller 10 is handled by similar communications circuitry 31. These communications circuits free the programmable controller 10 and the adapters 28, 28' of the local I/O racks 20, 20' from the computational overhead of monitoring and timing various link signals and allow the link protocol to be invisible with respect to the programmable controller 10 and the adapters 28, 28' of the local I/O racks 20, 20'. Such communications circuits 31 and 33 are well known in the art. Certain timing signals used in the communications protocol of the link 22, and decoded by the communication circuitry 31 and 33, are available to the controller 10 and adapter MAR circuits 40 and 41 and control the timing of the MAR circuits 40 and 41 as will now be described.

Figure 5:
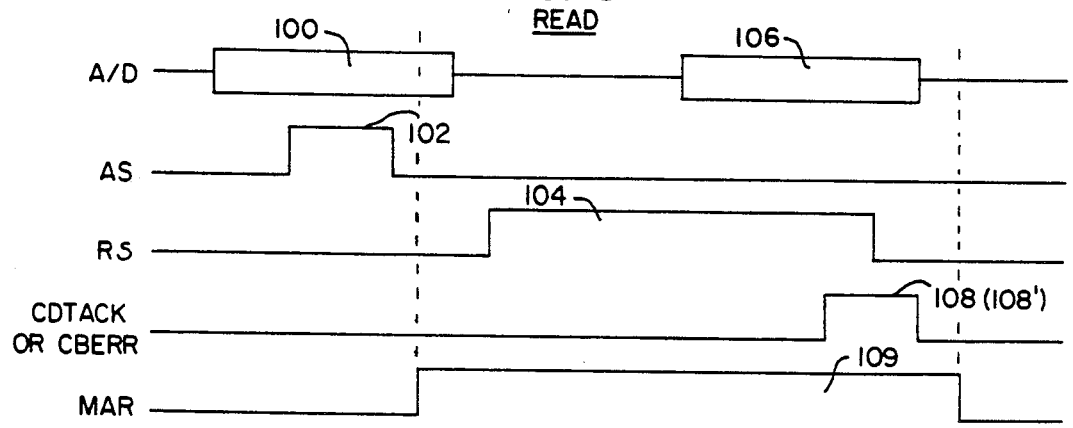
FIGS. 5 and 6 are timing diagrams of read and write cycles on the link between the controller and the adapters showing the activation of the multiple adapter response detection circuitry with relationship to the timing of the other link signals.
Figure 6:
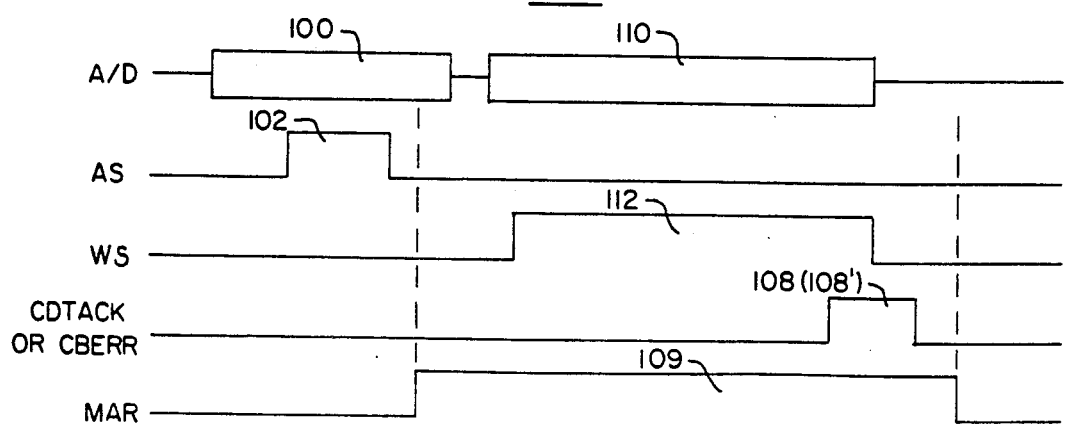

The general timing diagram of a read and write cycle on the parallel link 22 is shown in FIG. 5 and 6 and will be familiar to those of ordinary skill in the art. Referring first to FIG. 5, the programmable controller 10 may initiate a read cycle, during which data 106 may be, for example, transferred from the local I/O rack 20 to the programmable controller 10, by transmitting on the A/D lines of the link 22, the address 100 of the local I/O module 24 of interest. The status of this transmitted data as an address 100 is indicated by the presence of the address strobe signal 102 on the AS line which also serves to indicate that A/D lines have had time to settle into a valid state, taking into account various internal propagation delays. The programmable controller 10 then issues a read signal 104 on the RS line. The adapter 28 communications circuitry 33 compares this address 100 against its own address, set by the user, and if they match, upon the occurrence of the read signal 104, solicits the desired data 106 from the respective I/O modules 24 and transmits it to the programmable controller 10 via the A/D lines. As is well understood in the art, the A/D lines are tri-state to permit bi-directional communication between the programmable controller 10 and the local I/O adapters 28

Shortly after the address strobe 102, the control circuitry of the adapter 28 also activates the switch B to connect resistor 58 to the MAR line 44 which rises in voltage, as described, above depending on the number of other adapters 28' responding, to create a MAR signal 109.

The transmission of the data 106 is accompanyed by a data acknowledge signal 108 on the CDTACK line. If instead the CBERR line is asserted or if the controller MAR circuit 40 indicates that more or less than one adapter 28, 28' is responding to the particular address 100, then the communication circuitry 31 of the programmable controller 10 informs the programmable controller 10 of the exact nature of the error.

Referring now to FIG. 6, the programmable controller 10 may also initiate a write cycle, during which data 110 may be, for example, transferred to the local I/O adapter 28 from the programmable controller 10. The address 100 of the destination I/O module 24 is asserted on the A/D line and the address strobe signal 102 provided on the AS line as before. The programmable controller 10 then asserts the data 110 to be written, on the A/D lines, and issues a write strobe 112 on the WS line.

The adapter 28 communications circuitry 33 compares the address 100 against its own address, set by the user, and if they match, activates the adapter MAR circuit 41 closing switch B creating a MAR signal 109. Upon the occurrence of the write strobe 112, the adapter 28 receives the written data 110 and if the data error free asserts the CDTACK line to create a data transfer acknowledge signal 108. Conversely if the parity of the data is wrong, a bus error signal 108' is asserted on the CBERR line.

The voltage of the MAR line 44 during these transactions is monitored by the control circuitry 31 of the programmable controller 10 and if the voltage of the MAR signal 109 indicates the presence of more or less than one adaptor 28, 28' responding to the particular address 100, then the control circuitry 31 of the programmable controller 10 informs the programmable controller 10 of the exact nature of the error via communication channels therebetween.

A preferred embodiment of the invention has been described, but it should be apparent to those skilled in the art that many variations can be made without departing from the spirit of the invention. For example, the current generated on the MAR line 44 could be of either polarity and could be generated by other means than resistors so long as each adapter may generate a current increment that may combine to indicate the total number of adapters generating such current increments. Clearly this MAR detection circuit may be readily expanded to more than one remote adapter.

I claim:

1. A multiple adapter response detection circuit for a link, the link including a conductor and connecting a controller and at least one adapter, the controller transmitting an adapter address on the link to the adapter, the adapter detecting and responding to the presence of the adapter address on the link, the circuit comprising:
   (a) an adapter portion associated with the adapter including:
     a first current source for providing a current;
     a first switch responsive to the detection of the adapter address by the adapter for connecting the first current source to the conductor for a period of time after the detection, for inducing an incremental current flow on the conductor; and
   (b) a controller portion associated with the controller including:
     a summing junction connected to the conductor for receiving incremental current from at least one adapter portion and creating a total current;
     a comparator for measuring the total current and for indicating the total number of adapters responding to the adapter address.

2. The multiple adapter response detection circuit of claim 1 wherein:
   the first current source is a first resistor having a first and second end with the first end connected to a first voltage source and the second end connected to the first switch and wherein;
   the comparator is a voltage comparator for measuring the voltage generated by the total current across a second resistor connected between the conductor and a second voltage source.

3. The multiple adapter response detection circuit of claim 1 wherein the conductor may be terminated with a termination resistor and wherein the controller portion includes:
   a second current source for producing a current;
   a second switch for connecting the second current source to the conductor during a termination check mode, for inducing a predetermined current flow on the conductor when the conductor is terminated with the termination resistor; and
   an error signal means responsive to the comparator for generating an error signal when the current flow on the conductor differs from the predetermined current flow.

4. A multiple adapter response detection circuit for a controller, the controller transmitting an adapter address on a link, the link including a conductor and connected to at least one adapter, the adapter detecting and responding to the presence of the adapter address on the link by inducing an incremental current in the conductor, the detection circuit comprising:
   a summing junction connected to the conductor for receiving incremental current induced thereon by at least one adapter and creating a total current signal; and
   a comparator for measuring the total current and for indicating the total number of adapters responding to the adapter addresses.

5. A multiple response detection circuit for an adapter having an adapter address and connected to a link, the link including a conductor and connected to a controller, the controller transmitting the adapter address on the link and having a summing junction connected to the conductor for receiving and combining incremental currents on the conductor to create a total current and having a comparator for measuring the total current, the adapter including a means for detecting the presence of the adapter address on the link, the detection circuit comprising:
- a first current source for producing a current;
- a first switch responsive to the detection of the adapter address by the adapter for connecting the first current source to the conductor for a period of time after the detection, for inducing an incremental current flow on the conductor.

6. The multiple adapter response detection circuit of claim 5 wherein the first current source is a resistor having a first and second end, and wherein the first end is connected to a voltage source and the second end is connected to the first switch.

7. In a link having a conductor and connecting a plurality of adapters to a controller, each adapter having an adapter address, a method of determining the number of adapters having a given address comprising the steps of:
- transmitting the given address on the link;
- reading the given address at each adapter and comparing the given address to the address of the adapter;
- generating an incremental current in the conductor by each adapter whose adapter address matches the given address;
- producing a signal related to the sum of currents on the conductor produced by each adapter; and
- comparing the signal to a predetermined threshold.

* * * * *